(12) United States Patent
Särkkä et al.

(10) Patent No.: US 10,879,803 B2
(45) Date of Patent: Dec. 29, 2020

(54) METHODS AND APPARATUS TO PROVIDE ADAPTIVE COMPENSATION IN BUCK CONVERTERS OR OTHER SWITCHED MODE POWER SUPPLIES

(71) Applicant: Texas Instruments Incorporated, Dallas, TX (US)

(72) Inventors: Jussi Matti Aleksi Särkkä, Oulunsalo (FI); Ari Kalevi Väänänen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 22 days.

(21) Appl. No.: 16/115,439

(22) Filed: Aug. 28, 2018

(65) Prior Publication Data
US 2020/0076303 A1 Mar. 5, 2020

(51) Int. Cl.
*H02M 1/00* (2006.01)
*H02M 1/14* (2006.01)
*H02M 3/158* (2006.01)

(52) U.S. Cl.
CPC ......... *H02M 3/1582* (2013.01); *H02M 1/143* (2013.01); *H02M 2001/007* (2013.01); *H02M 2001/0009* (2013.01); *H02M 2001/0025* (2013.01)

(58) Field of Classification Search
CPC ................... H02M 1/14; H02M 1/143; H02M 2001/0009; H02M 2001/007; H02M 3/1582; H02M 2001/0016; H02M 2001/0019; H02M 2001/0022; H02M 2001/0025; H02M 2001/0045; H02M 2001/4291
See application file for complete search history.

(56) References Cited

U.S. PATENT DOCUMENTS

| | | | |
|---|---|---|---|
| 7,518,348 B1 * | 4/2009 | Kobayashi | H02M 3/156 323/222 |
| 7,936,160 B1 | 5/2011 | Sheehan | |
| 7,982,448 B1 * | 7/2011 | Prasad | G05F 1/575 323/311 |
| 2006/0244545 A1 * | 11/2006 | Briskin | H03K 5/13 331/135 |

(Continued)

FOREIGN PATENT DOCUMENTS

SU 1704143 A1 7/1992

OTHER PUBLICATIONS

Patent Cooperation Treaty Search Report, PCT/US 2019/048295, dated Dec. 5, 2019, 2 pages.

*Primary Examiner* — Jue Zhang
*Assistant Examiner* — David A. Singh
(74) *Attorney, Agent, or Firm* — Ray A. King; Charles A. Brill; Frank D. Cimino

(57) ABSTRACT

A power converter includes a power conversion circuit, an adaptive compensator coupled to a first output of the power conversion circuit, the adaptive compensator including, a voltage receiving circuit to generate a first current and a second current, a current mirror circuit coupled to the voltage receiving circuit, wherein the current mirror circuit replicates at least one of the first current or the second current, and a second output of the adaptive compensator, and a comparator to receive an input that is related to the second output of the adaptive compensator.

15 Claims, 12 Drawing Sheets

(56) References Cited

U.S. PATENT DOCUMENTS

| | | | | |
|---|---|---|---|---|
| 2007/0112443 A1* | 5/2007 | Latham | ................ | H02M 3/157 700/29 |
| 2008/0297226 A1* | 12/2008 | Bhattacharya | ... | H03K 19/00384 327/362 |
| 2009/0322300 A1* | 12/2009 | Melanson | ........... | H02M 3/1563 323/284 |
| 2010/0207594 A1* | 8/2010 | Davoudi | ............... | H02M 3/157 323/283 |
| 2011/0018507 A1* | 1/2011 | McCloy-Stevens | ......................... | H02M 3/1588 323/271 |
| 2011/0148381 A1* | 6/2011 | Kwan | ................... | H02M 3/156 323/285 |
| 2012/0119718 A1* | 5/2012 | Song | .................. | H02M 3/1588 323/282 |
| 2012/0268095 A1 | 10/2012 | Wu | | |
| 2013/0147446 A1* | 6/2013 | Kris | .......................... | G06F 1/26 323/273 |
| 2015/0357914 A1* | 12/2015 | Ozanoglu | ............. | H02M 3/158 323/271 |
| 2016/0259355 A1* | 9/2016 | Farber | ................. | H03K 5/2481 |
| 2018/0301985 A1* | 10/2018 | Kesarwani | ............ | H02M 3/157 |

* cited by examiner

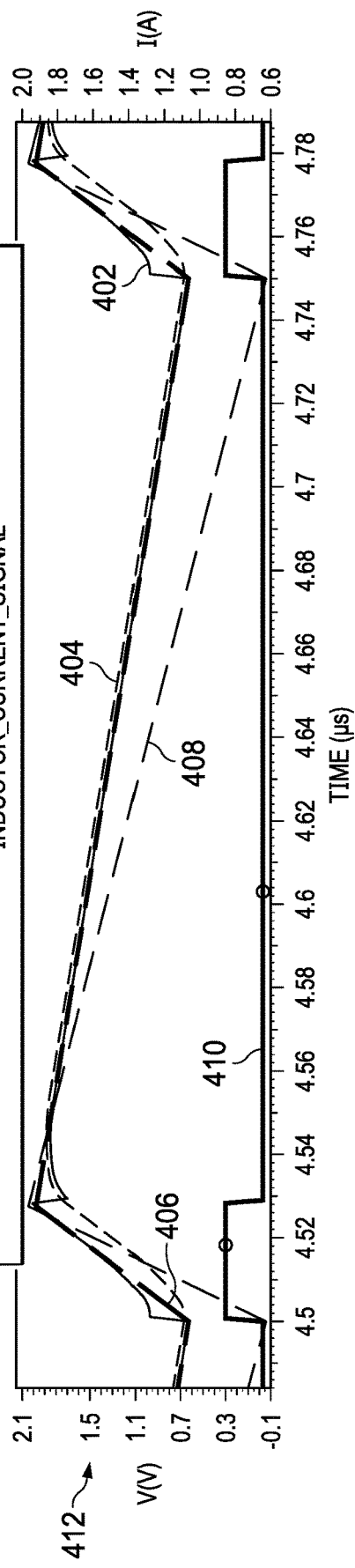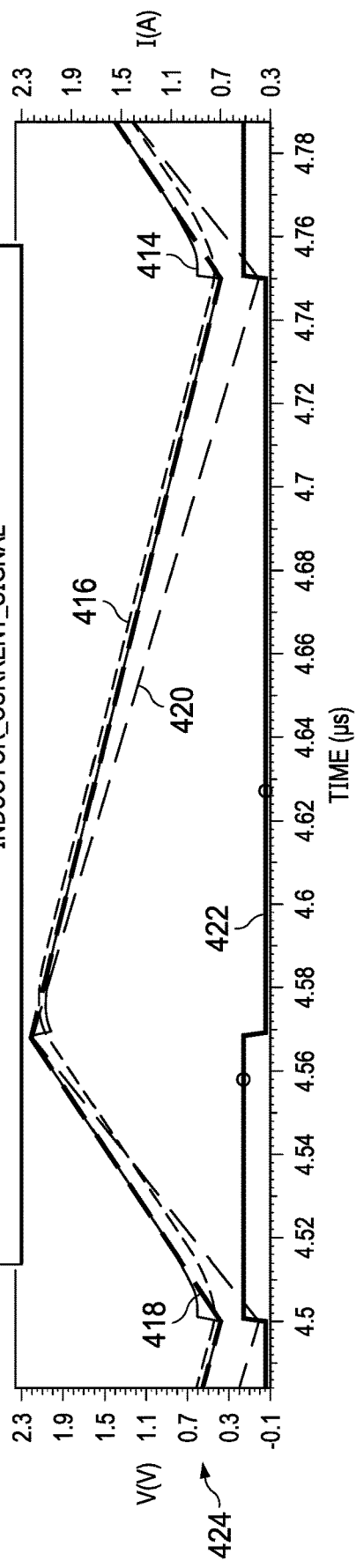

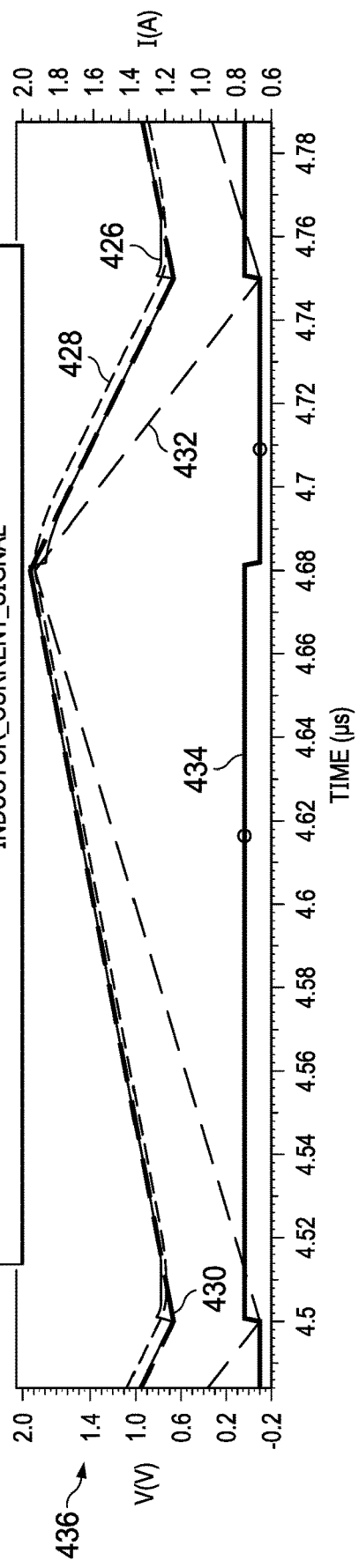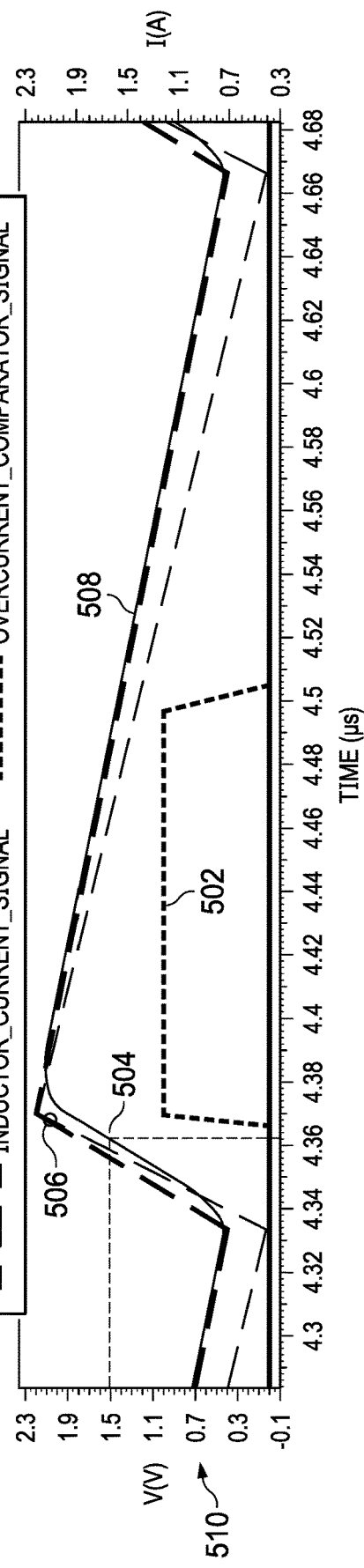

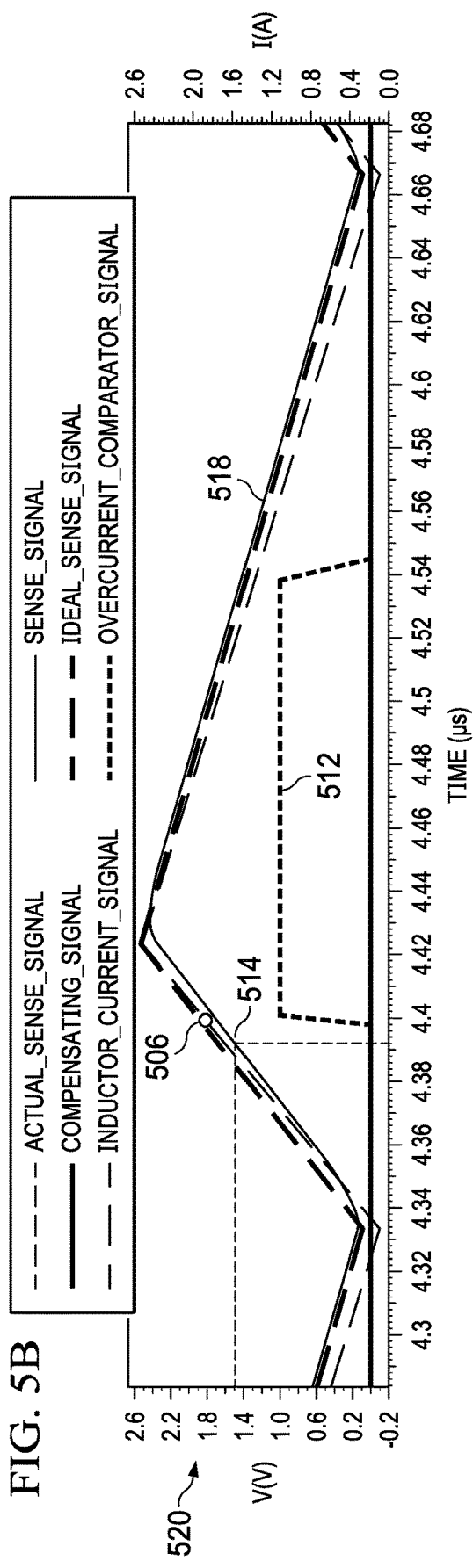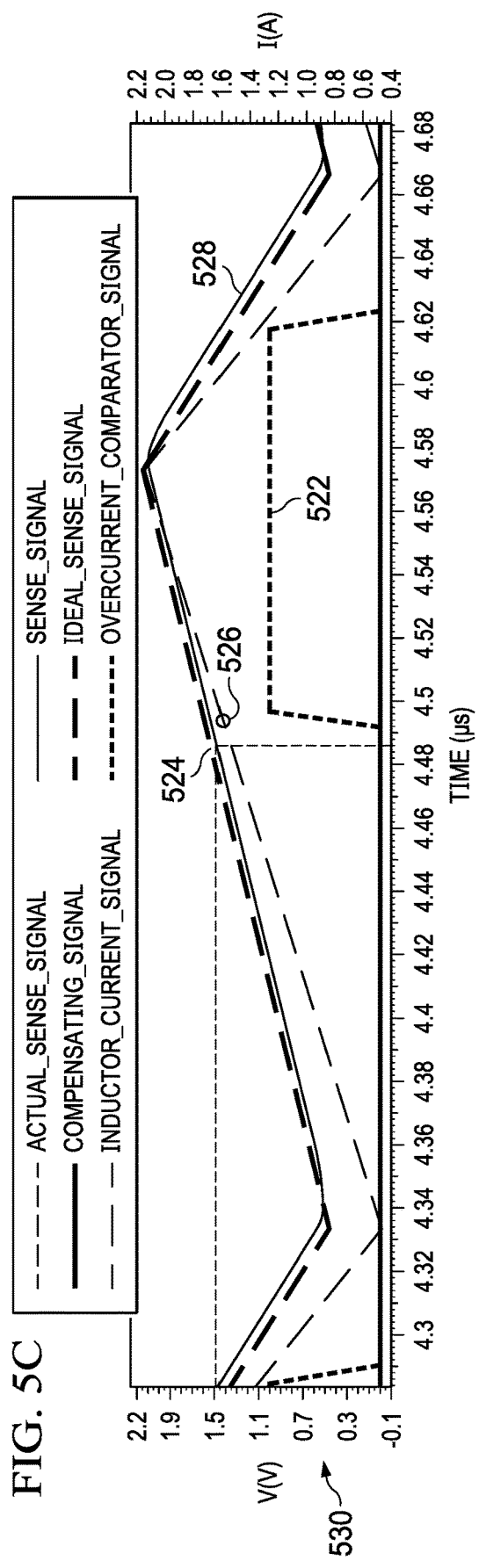

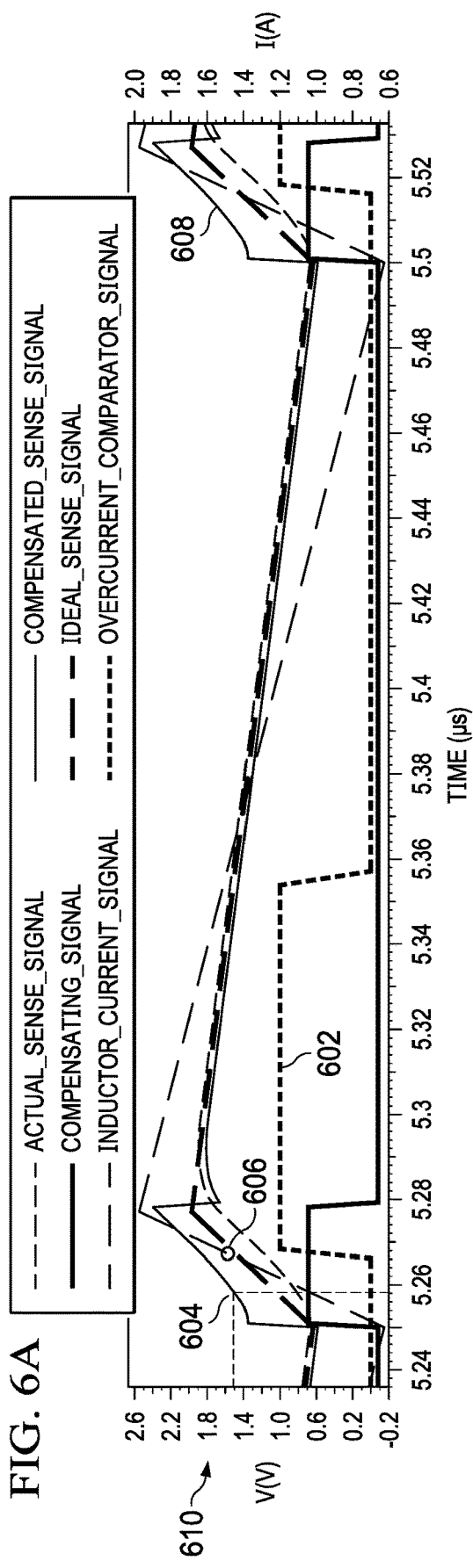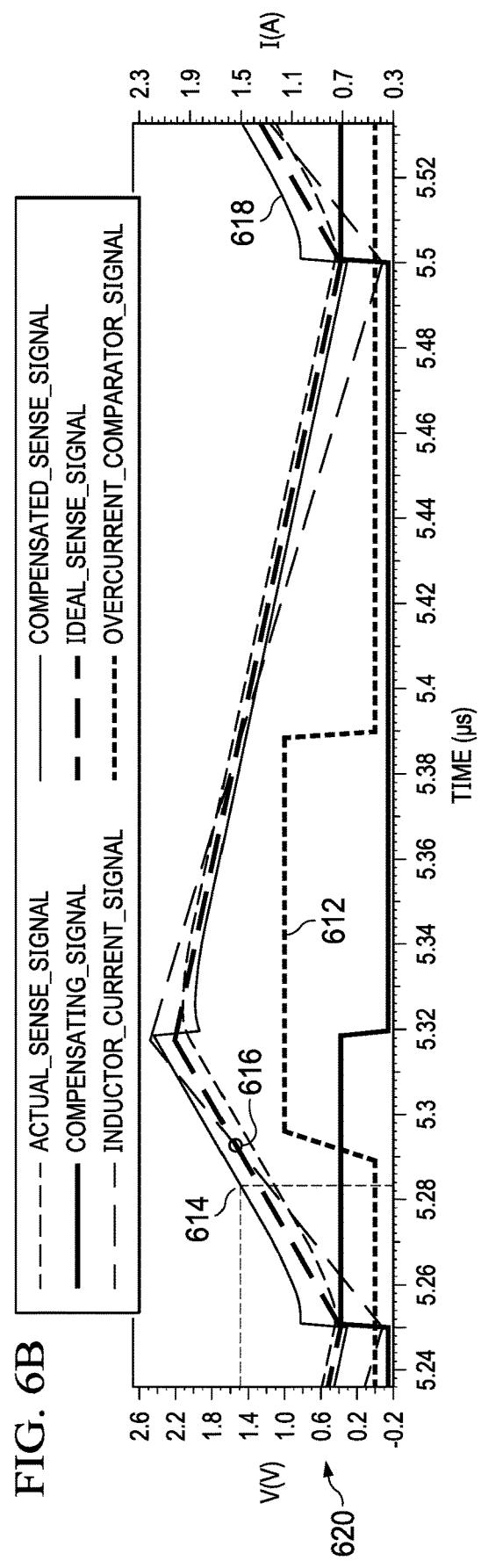

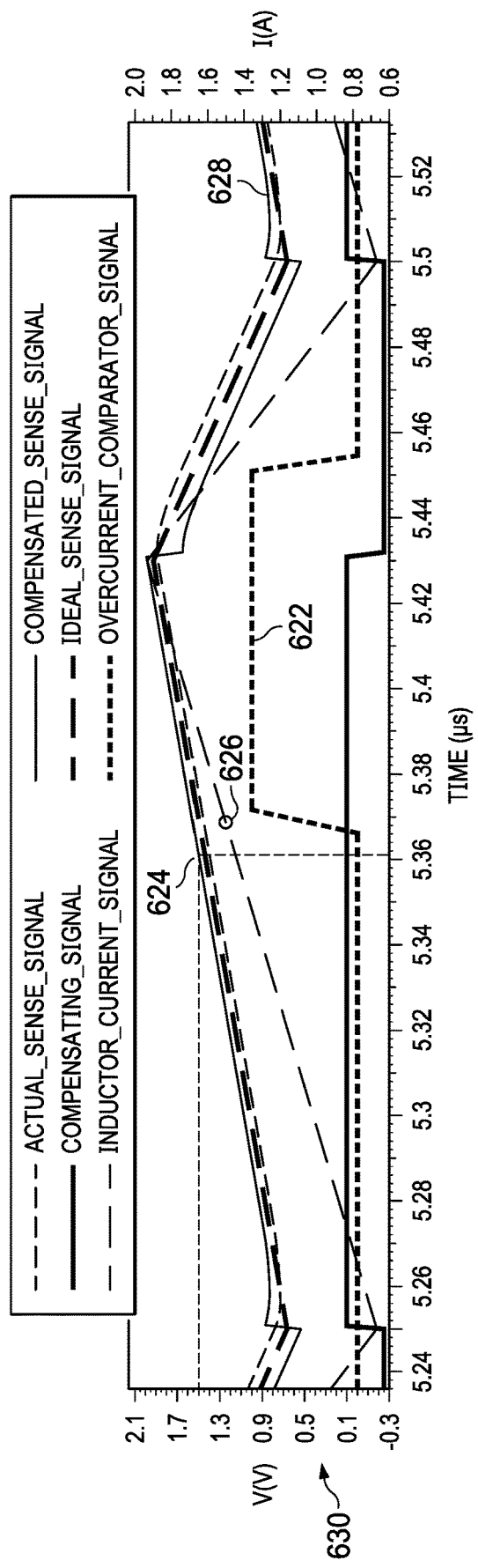

METHODS AND APPARATUS TO PROVIDE ADAPTIVE COMPENSATION IN BUCK CONVERTERS OR OTHER SWITCHED MODE POWER SUPPLIES

FIELD OF THE DISCLOSURE

This disclosure relates generally to adaptive compensation, and, more particularly, to system and apparatus to provide adaptive current compensation in buck converters or other switched mode power supplies.

BACKGROUND

A power converter is a circuit that is used in various devices to convert an input voltage to a desired output voltage. For example, a buck converter converts a direct current (DC) input voltage into a lower DC output voltage by controlling transistors and/or switches to charge and/or discharge inductors and/or capacitors to maintain the desired output voltage. Power converters may include one or more power switches that may be used to change the path of current in the power converters.

SUMMARY

An example apparatus includes a power conversion circuit, an adaptive compensator coupled to a first output of the power conversion circuit, the adaptive compensator including, a voltage receiving circuit to generate a first current and a second current, a current mirror circuit coupled to the voltage receiving circuit, wherein the current mirror circuit replicates at least one of the first current or the second current, and a second output of the adaptive compensator, and a comparator to receive an input that is related to the second output of the adaptive compensator.

BRIEF DESCRIPTION OF THE DRAWINGS

FIGS. 4A-4C, collectively FIG. 4, are graphical illustrations of the sensed current before and after adaptive compensation.

FIGS. 5A-5C, collectively FIG. 5, are graphical illustrations of the over current comparator triggering times before compensation has been applied.

FIGS. 6A-6C, collectively FIG. 6, are graphical illustrations of the over current comparator triggering times after compensation has been applied.

Figure 1:
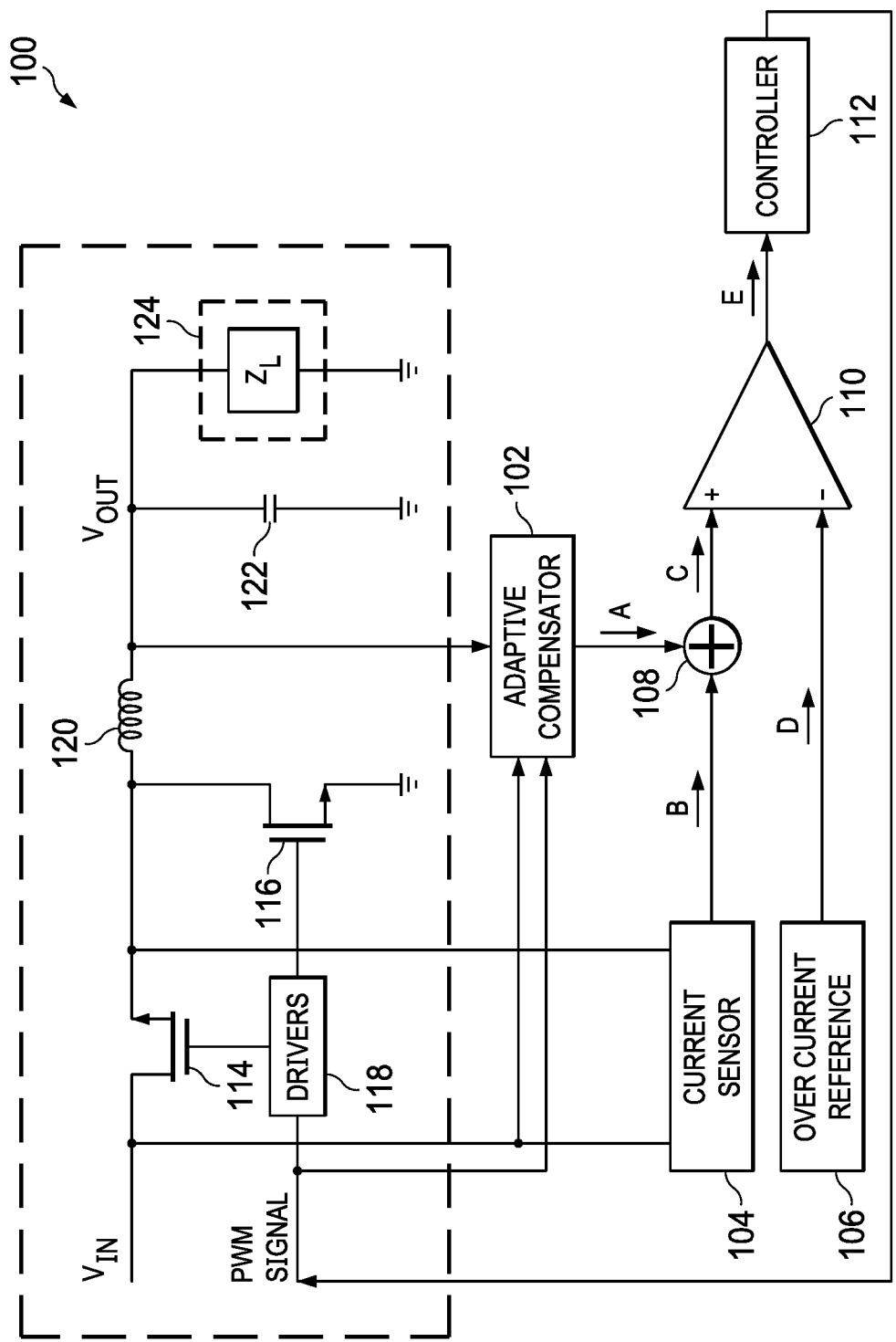
FIG. 1 is a block diagram of a power converter including adaptive circuitry coupled to sensing circuitry.

The figures are not to scale. In general, the same reference numbers will be used throughout the drawing(s) and accompanying written description to refer to the same or like parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Power converting circuits are often considered the standard of Direct Current (DC) voltage to DC voltage power conversion. Power converting circuits, also called power switching circuits, power conversion circuits, or switched mode power supplies typically receive an input voltage and generate an output voltage proportional to the input voltage. For example, a Buck Converter is a power converting circuit which generates an output voltage that is lower in magnitude than the input voltage, also known as a step-down converter.

A key aspect of power converting circuits is the ability to control the maximum and minimum currents of the inductor to avoid damaging the load, system or the converter itself. For example, if a certain electronic device (such as an LED) is voltage sensitive, a power converting circuit maintains the maximum current seen at the load (LED in this example), therefore regulating the maximum output voltage. In this manner, the electronic device (LED) is not subject to conditions outside of the safe operating area of the electronic device.

A power converting circuit typically contains at least one switch, at least one inductor, and at least one capacitor. The switch in a power converting circuit may be a metal oxide semiconductor field effect transistor (MOSFET), bipolar junction transistor (BJT), diode, etc. The capacitor and inductor assist in providing a smooth output voltage to the load. A smooth output voltage corresponds to a low ripple current in the inductor and a low ripple voltage in the output. Therefore, in limiting the current through the inductor, the output voltage can be regulated to a user specified value.

To limit the current through the inductor, typically a current sensor is used with a comparator. The comparator will compare the current through the inductor against a pre-determined reference. The resulting output of the comparator can be used with a controller (i.e., a microcontroller) to adjust the turn on time of the example switch, thus regulating the maximum positive current and/or minimum negative current of the power converter. Examples disclosed herein include regulating the maximum positive current and/or minimum negative current of an inductor more accurately. Additionally, the inductor current slope may vary greatly depending on changing input voltages and output voltages. Examples disclosed herein include limiting of current in the inductor to prevent damage to the load, system, or power converter.

Typically, there exists an intrinsic delay in both the current sensor and comparator. This intrinsic delay leads to inaccurate current limiting techniques due to the inaccurate current sensor. Additionally, with a delay in a comparator, the example power converter may limit inductor current later than intended. Thus, subjecting devices in the power converter to higher than normal operating conditions. In sensing current through an inductor, there exists an intrinsic delay in the sensed signal due to the non-ideality of current sensing components. Likewise, there may exist an intrinsic delay in the comparator due to the non-ideality of the comparator. Examples disclosed herein include methods and apparatus to create an adaptive compensating offset. An adaptive compensating offset can be used to decrease the variance resulting from over current limiting. The adaptive compensating offset varies based on changing input and output voltages. For example, while the input voltage may remain relatively constant (i.e., plus or minus millivolts,) the output voltage may vary greatly (i.e., plus or minus volts.) During load changes or operation changes, the output voltage may increase or decrease greatly, therefore affecting the inductor slope. Examples disclosed herein include injecting an adaptive compensating office to the current sensor and the input of the comparator to take into account the variance which may occur from the inductor current slope. Additionally, the adaptive compensating offset may be used to correct delays in the current sense signal and/or current sense reference. Examples disclosed herein include implementing the adaptive compensating offset in any power converter or switched mode power supply (i.e., Buck Converter.)

FIG. 1 is a block diagram of a power converter 100 including adaptive circuitry coupled to sensing circuitry. Further, FIG. 1 is a schematic illustration of an example implementation of the adaptive compensator 102 in a buck converter wherein the signal generated by the adaptive compensator 102 is injected into the current sensor signal. In other example implementations, the adaptive compensator 102 may be coupled with a boost converter, buck-boost converter, or any other power converter. The adaptive compensator 102 of FIG. 1 is coupled to a current sensor 104. In the example implementation illustrated in FIG. 1, the intrinsic delay of the current sensor 104 is compensated for. Likewise, in the example illustrated in FIG. 1, the intrinsic delay of the comparator can be compensated for. In other examples disclosed herein, the adaptive compensator 102 may be coupled with the over current reference 106. The over current comparator 110 is coupled to a controller 112 wherein the controller 112 is coupled to the power converter PWM signal.

The example adaptive compensator 102 is coupled to the example power converter 100 (e.g., buck converter) and the summing junction 108. The adaptive compensator 102 receives the input voltage and output voltage of the buck converter and generates a current A with respect to the variable input voltage and output voltage values. The adaptive compensator 102 receives a variant of the PWM signal (e.g., a voltage) so the switch operation may be determined. In this example, when the example high side power FET 114 is operating, the voltage signifying the switch operation received by the adaptive compensator 102 will be high. When the example low side power FET 116 is operating, the voltage signifying the switch operation received by the adaptive compensator 102 will be low. It can be appreciated that the adaptive compensator 102 may be implemented as a circuit and/or a network of devices (i.e., adaptive compensator circuit and/or adaptive compensator network.)

The current sensor 104 is coupled to the power conversion circuit and the summing junction 108. The current sensor 104 senses the peak input current (i.e., in the example depicted in FIG. 1, the current through the inductor.) The current sensor 104 includes sensing field effect transistors (Sensing FETs) which generate a voltage and/or current proportional the current through the inductor 120 via internal drain to source resistances ($RDS_{ON}$) of the Sensing FET and the high side power FET 114 and/or the low side power FET 116. In examples disclosed herein, the output B of the current sensor 104 is coupled to the summing junction 108. The output of the current sensor 104 is injected with the output of the adaptive compensator 102 at the summing junction 108. The adaptive compensator 102 generates a signal A which is a current. Likewise, the current sensor 104 generates a signal B which is a current.

The over current reference 106 is coupled to the inverting input terminal of the over current comparator 110. The over current reference 106 generates a signal representative of a constant current needed through the power conversion circuit. The signal generated by the over current reference 106 ensures the steady operation of the power conversion circuit. In the example depicted in FIG. 2, over current comparator 110 receives voltage type inputs, therefore the output of the over current reference 106 is a reference voltage signal. In this scenario, the inductor 120 current is more accurately controlled to regulate the output voltage or to regulate the inductor current to a desired value. In this manner, the maximum positive current and/or minimum negative currents of the inductor 120 are limited to protect the load 124, system, or power converter 100 from damage due to over current. Additionally, the over current reference 106 may generate a reference current signal. For example, the over current reference 106 may generate a reference current signal of 1.5 amperes, therefore setting a maximum current through the inductor 120 of 1.5 amperes.

The example summing junction 108 is coupled to the adaptive compensator 102 and the current sensor 104. The summing junction 108 injects the adaptive compensator 102 signal A into the current sensor 104 signal B. The summing junction ensures the adaptive compensator 102 signal A is added or subtracted to the current sensor 104 signal B. The output of the summing junction 108 is a voltage signal C. The output signal C of the summing junction 108 is coupled to the non-inverting terminal of the over current comparator 110.

The example over current comparator 110 receives two inputs and generates one output. The newly compensated signal C is coupled to the non-inverting input terminal and the over current reference signal D is coupled to the inverting input terminal. In other examples, the newly compensated signal C may be coupled to the inverting input terminal and over current reference signal D may be coupled to the non-inverting input terminal. The output E of the over current comparator 110 is a logic high or logic low signal, coupled to a controller 112.

The example controller 112 is used to regulate certain values in the example power conversion circuit. In this example, the peak current seen by the inductor 120 is regulated to maintain a certain value, determined by the over current reference 106. In this manner, the voltage seen by the load 124 is essentially regulated to a maximum voltage. Additional examples include regulating the load 124 voltage to maintain a maximum allowable voltage, regulating the load 124 current, or limiting the maximum positive current and/or minimum negative current of the inductor 120 to avoid damage to the load 124, power converter 100 or system. The controller 112 exists in the form of, but not limited to, a microcontroller. In other examples, the controller 112 may be implemented with discrete components.

The example high side power field effect transistor (high side power FET) 114 is an electronic switch which operates (i.e., conducts) when the incoming PWM signal is high. Alternatively, the high side power FET 114 may be a bipolar junction transistor (BJT), metal oxide semiconductor field effect transistor (MOSFET), junction gate field effect transistor (JFET), etc.

The example low side power field effect transistor (high side power FET) 114 is an electronic switch which operates (i.e., conducts) when the incoming PWM signal is low. Alternatively, the low side power FET 116 may be a bipolar junction transistor (BJT), metal oxide semiconductor field effect transistor (MOSFET), junction gate field effect transistor (JFET), etc. The PWM signal is a turn-on and/or turn-off signal generated to control the operation of the high side power FET 114 and/or low side power FET 116. An example Pulse Width Modulated (PWM) signal is injected into an example driver 118. The PWM signal is an oscillating signal varying in duty cycle. Alternatively, the PWM signal may vary in frequency, therefore noted as a Pulse Frequency Modulated signal (PFM). The PWM and/or PFM signal injected into the driver 118 contains information pertaining to the turn on and/or turn off times of the example high side power FET 114 and/or the example low side power FET 116. In other examples, the PWM and/or PFM signal injected into the driver 118 may contain information pertaining to the turn on and/or turn off times of any power switch.

The example driver 118 receives the PWM signal and based on the amplitude of the PWM signal, operates either the high side power FET 114 and/or the low side power FET 116. The driver 118 receives a low current digital input signal, PWM signal. The driver 118 receives the PWM signal and turns on a high current switch, i.e., the high side power FET 114 and/or low side power FET 116. The driver differentiates high sider power FET 114 operation from low side power FET 116 operation through the use of comparators, operational amplifiers, or any other electrical component.

The example inductor 120 is a two terminal electrical component which stores energy in a magnetic field when current flows through it. During high side operation (i.e., the high side power FET 114 is conducting) energy is being stored in the inductor 120. On the other hand, during low side operation (i.e., the low side power FET 116 is conducting) energy is being discharged through the inductor 120.

The example capacitor 122 is a two terminal electrical component which stores potential energy in an electric field. During high side operation (i.e., the high side power FET 114 is conducting) potential energy is being stored in the capacitor 122. On the other hand, during low side operation (i.e., the low side power FET is conducting) potential energy is being discharged through the capacitor 122.

The example load 124 is a component of the circuit which consumes electrical power. The load 124 includes, but not limited to, capacitive loads, inductive loads, resistive loads, or any combination set forth herein. In other examples disclosed herein, the load 124 directly corresponds to a load of automobile application. For example, the load 124 may consist of interior lights in an automobile or electrical relays in an automobile.

Figure 2:
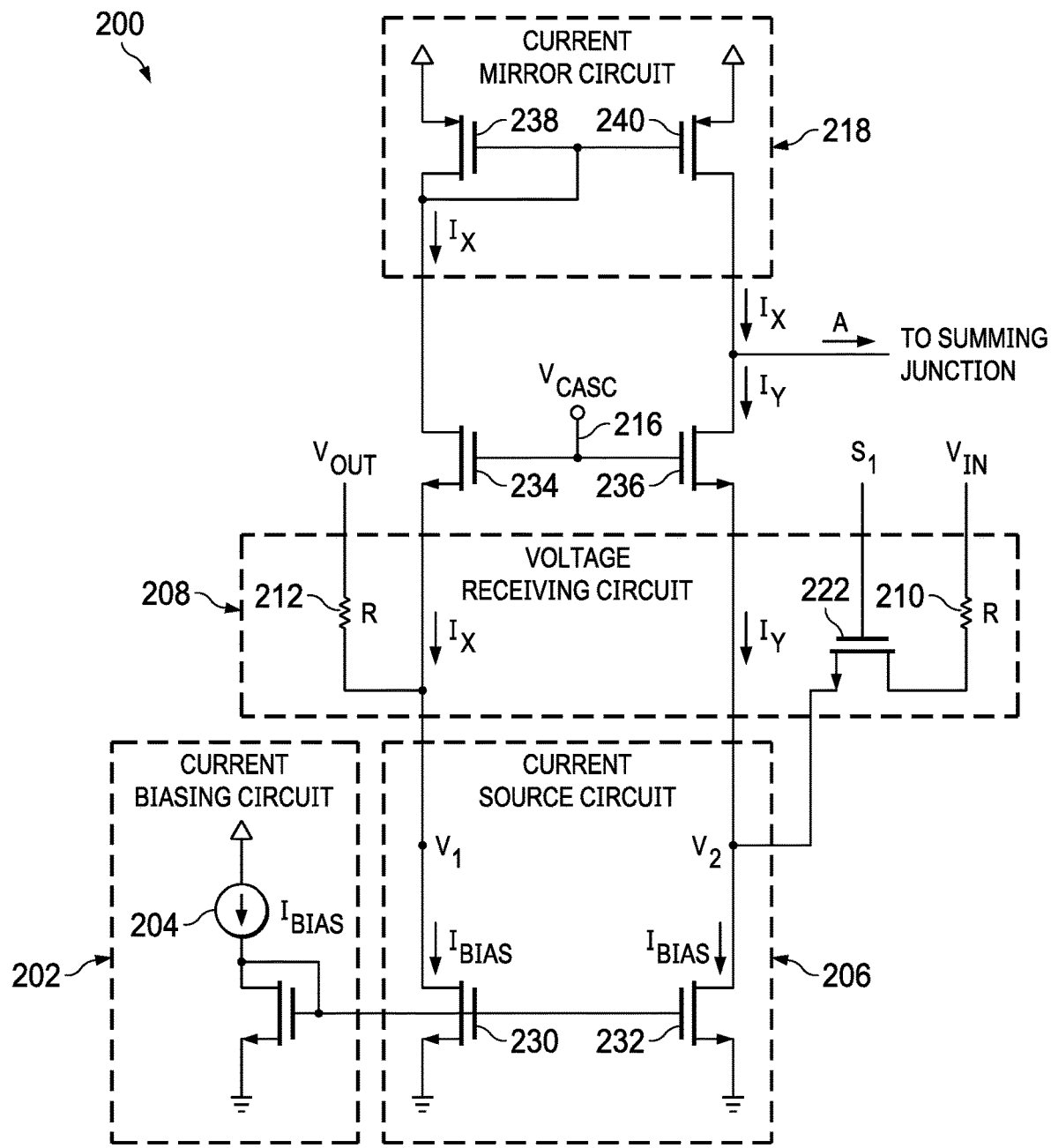
FIG. 2 is a schematic including further detail of example circuitry that may be used to implement the adaptive compensator of FIG. 1.

FIG. 2 is a schematic including further detail of example circuitry 200 that may be used to implement the adaptive compensator 102 of FIG. 1. An example voltage receiving circuit 208 receives three inputs: output voltage, input voltage, and a signal $S_1$ that indicates whether the high side power FET 114 or the low side power FET 116 is conducting. In other examples, the voltage receiving circuit 208 may receive more or less than three inputs. The voltage receiving circuit is coupled to a current source circuit 206 and a current mirror circuit 218. The current source circuit is coupled to a current biasing circuit 202. The current mirror circuit 218 is coupled to the summing junction 108.

The example current biasing circuit 202 is coupled to the example current source circuit 206. The current biasing circuit 202 receives a current, $I_{BIAS}$ 204, and creates a biasing voltage for the gate voltages of transistors 230, 232. The currents of transistors 230, 232 are therefore proportional to $I_{BIAS}$ 204 $I_{BIAS}$ 204 can be generated by a transistor current source, external current source, etc.

In the example current source circuit 206, the gate terminals of the transistors 230, 232 are coupled to receive the same input signal. The drain terminals of the transistors 230, 232 are coupled with the voltage receiving circuit to $V_{OUT}$ and $V_{IN}$ respectively. The transistors 234, 236 together with the voltage $V_{CASC}$ 216 are configured so voltages seen at nodes $V_1$ and $V_2$ are minimal. Configuration may be done by determining and selecting transistors with specific device constraints. For example, the transistors 234, 236 coupled to $V_{CASC}$ 216 will be selected with operating constraints that, based on $V_{CASC}$ 216, will keep transistors 230, 232 in saturation. Operating constraints consists of selecting transistors with appropriate drain to source resistance, threshold voltage, etc., so that the value of $V_{CASC}$ 216 governs the operation and saturation of the transistors 230, 232. For example, if the transistors 230 and 232 were N-channel MOSFET's, one way to ensure saturation is to ensure the drain to source voltage ($V_{DS}$) of transistors 230, 232 is set so that it is greater than then gate to source voltage ($V_{GS}$) minus the transistor turn on voltage ($V_T$ or threshold voltage.) When the transistors 230 and 232 are in saturation, the transistors 230 and 232 are conducting and the voltage at the drain of the transistors 230 and 232 will not have a large effect on the current of the transistors 230 and 232. In other words, the output resistance (i.e., the resistance seen at the transistor drain terminal) is large and the transistor can act as a good current source, whose current does not change significantly regardless of the drain voltage. For example, the voltage at $V_1$ may be 100 mV, providing a negligible reference for the voltage received at $V_{OUT}$, without directly grounding the node and while keeping the transistor 230 in saturation. In this example, the drain to source voltage ($V_{DS}$) of transistors 230, 232, may be greater than the gate to source ($V_{GS}$) voltage minus the threshold voltage. Thus, the current biasing circuit 202 may set the gate to source voltage of transistors 230, 232 to satisfy the above constraint. Alternatively, to keep the transistors 230, 232 in saturation, the transistors 234, 236 along with the voltage $V_{CASC}$ 216, so that the drain to source voltage of transistors 230, 232 remains greater than the gate to source voltage of transistors 230, 232 minus the threshold voltage of transistors 230, 232 respectively. In other examples, the transistors 230 and 232 may be another type of transistor (i.e., P-channel MOSFET, BJT, etc.,) and thus the voltages to fulfill saturation will change accordingly. Additionally, regardless of transistor type chosen, one of ordinary skill in the art will appreciate the constraints needed to keep the transistor in saturation. By selecting $V_{CASC}$ 216 and transistors 234, 236, 230, or 232, the transistors 230 and 230 can always be saturated.

The voltage receiving circuit 208 includes two resistors 210, 212 of equivalent resistance. In addition, the voltage receiving circuit includes a switch 222 operated by the signal $S_1$. The signal $S_1$ will turn the switch on (i.e., conduct) when the high side power FET (114 of FIG. 1) is conducting. Likewise, the signal S1 will turn the switch 222 off (i.e., not conduct) when the low side power FET (116 of FIG. 1) is conducting. The example switch 222 may include any electrical device (e.g., metal oxide semiconductor field effect transistor, bipolar gate junction transistor, diode, etc.) in which conduction is determined by an input signal.

Knowing the voltages at $V_1$ and $V_2$ are essentially zero, it follows there are two scenarios in which the current A is generated. During high side operation, switch 222 governed by signal $S_1$ is conducting. Therefore, from nodes $V_{IN}$ to $V_2$, over the resistor 210, there exists a voltage drop causing the current $I_Y$ to be approximately:

$$I_Y = I_{BIAS} - \frac{V_{IN}}{R} \quad (1)$$

Likewise, there exists a voltage drop over the resistor 212 coupled between $V_{OUT}$ and $V_1$. The voltage drop creates a current $I_X$ to be approximately:

$$I_X = I_{BIAS} - \frac{V_{OUT}}{R} \quad (2)$$

The example $V_{CASC}$ signal 216 is coupled to the example cascade transistors 234 and 236 such that the gate terminals of 234 and 236 receive the same signal. In this example, cascade transistors 234 and 236 receive a gate voltage, $V_{CASC}$ 216. The cascade transistors 234, 236 ensure the voltage at the source terminal nodes ($V_1$ and $V_2$ respectively) is set close to zero. Additionally, the cascade transistors 234, 236 ensure the transistors in the current source circuit 206 remain in the saturation region (i.e., conducting and the voltage at the drain of the transistors 234,236 does not have a large effect on its' current.)

The example current mirror circuit 218 replicates current from the current source circuit 206. The current mirror circuit 218 uses transistors 238 and 240 to replicate the current $I_X$ from transistor 238 onto the coupled transistor 240. In other examples, the current mirror circuit may be an operational amplifier current source, LED current source, voltage regulator current source, etc.

The summing junction 108 is coupled to receive a current, A, including currents $I_x$ and $I_y$. During high side operation (i.e., the high side switch 114 of FIG. 1 is conducting), the current A is a resulting current from $I_Y$ and $I_X$. Since resistors 210, 212 are equivalent in resistance, the current A is approximately $I_X$ minus $I_Y$, or more specifically:

$$\left(I_{BIAS} - \frac{V_{OUT}}{R}\right) - \left(I_{BIAS} - \frac{V_{IN}}{R}\right) = \frac{V_{IN} - V_{OUT}}{R} \quad (3)$$

Accordingly, during low side operation (i.e., the low side power FET 116 is conducting), the switch 222 receiving switching signal $S_1$ will be off (i.e., not conducting). Therefore, the current will be blocked and thus $I_Y$ will be $I_{BIAS}$. Thus, the current coupled to the summing junction 108 will be $I_X$ minus $I_Y$, or more specifically:

$$\left(I_{BIAS} - \frac{V_{OUT}}{R}\right) - (I_{BIAS}) = \frac{-V_{OUR}}{R} \quad (4)$$

During the case when the output voltage is increasing (i.e., during high side operation when the capacitor (122 of FIG. 1) is being charged), the current $I_X$ will decrease. This is seen through equation 2. There will be no effect on the magnitude of current $I_Y$ since current $I_Y$ is independent of output voltage. In response, the current A sent to the summing junction 108 will increase. This is shown in equations 3 and 4; increasing output voltage will have an opposite effect on the current A to the summing junction 108.

Alternatively, when the output voltage is decreasing (i.e., during low side operation when the capacitor 122 of FIG. 1 is discharging) the current $I_X$ will increase. This is seen through equation 2. There will be no effect on the magnitude of current $T_Y$ since current $T_Y$ is independent of output voltage. In response, the current A sent to the summing junction 108 will decrease. This is shown in equations 3 and 4; decreasing output voltage will have an opposite effect on the current A to the summing junction 108.

The current A sent to the summing junction 108 is used to create an adaptive compensating offset. As disclosed herein, the current A is adaptive based on the input and output voltage. As the output voltage increases and/or decreases, the current A sent to the summing junction will change as a result. The current A sent to the summing junction 108 will account for the variable inductor slope, changing input voltage, or changing output voltage.

Figure 3:
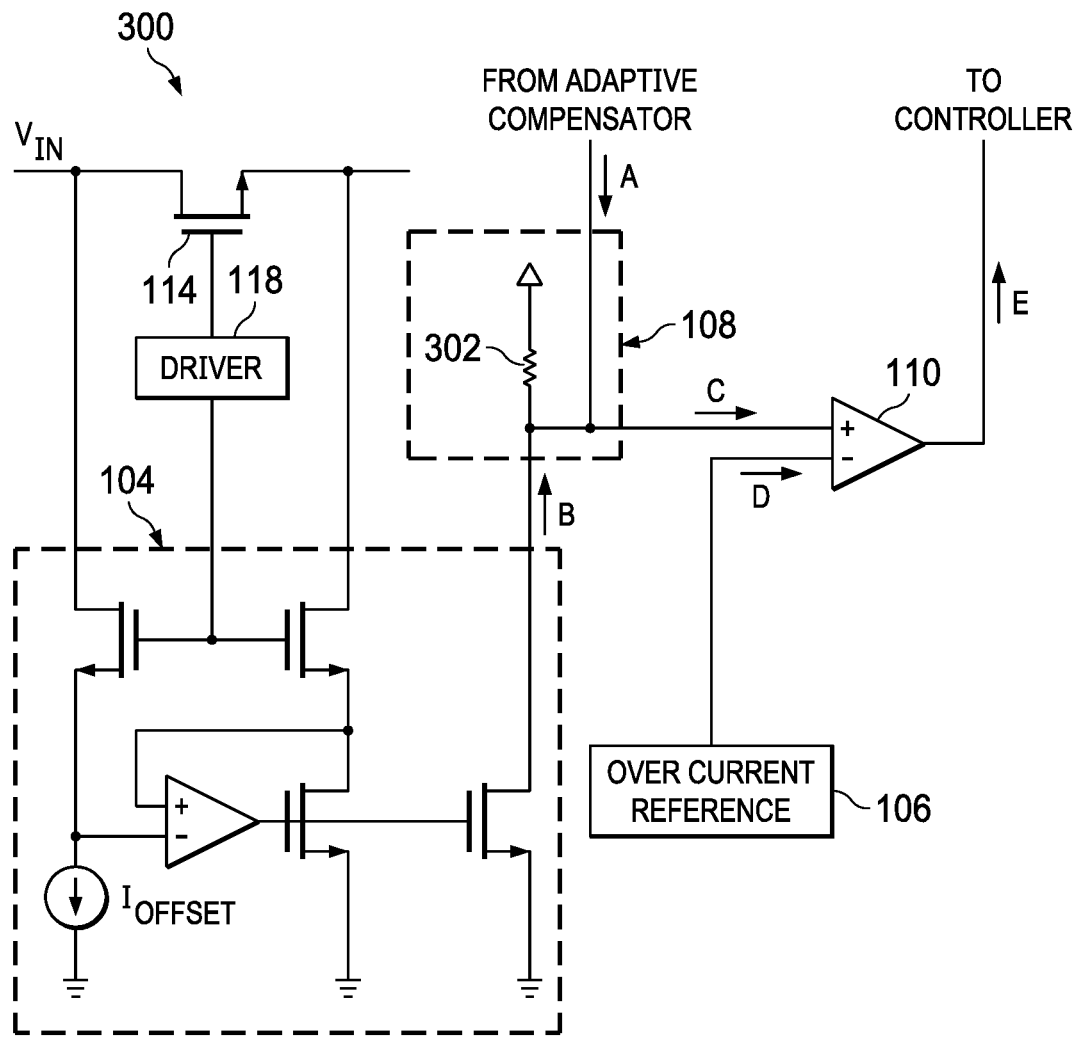
FIG. 3 is a block diagram including circuitry for the current sensor and summing junction of FIG. 1.

FIG. 3 is a block diagram including circuitry for the current sensor and summing junction of FIG. 1. In the example block diagram 300, the summing junction 108 is coupled to the non-inverting input terminal of the example over current comparator 110. The example over current comparator 110 compares voltage type signals. The inverting input of the over current comparator 110 is a voltage reference signal D representative of the desired reference current signal with respect to a load. For example, if the desired reference current signal is 1.5 amperes, this may equate to a 12-volt input into the inverting terminal of the over current comparator 110.

The example current sensor 104 of FIG. 1 is portrayed in FIG. 3. The current sensor 104 uses field effect transistors (FETs), an operational amplifier, and an offsetting current source to sense the inductor current through the inductor 120 of FIG. 1. In other examples, the current sensor 104 may be implemented with a microcontroller, shunt resistor, etc. The example FETs show in the current sensor may be JFETs, MOSFETs, diodes, etc. The current through the inductor 120 runs through an example resistor 302 to create a voltage from the voltage drop over the resistor 302. In addition, the adaptive compensation signal A runs through the example resistor 302 as well. The voltage drop created at the non-inverting terminal of the over current comparator 110 is a voltage C that is a voltage representative of the compensated sensed inductor current in the power conversion circuit. Example implementations depicted in FIG. 3 are used to limit the maximum positive inductor current and/or the minimum negative inductor current. Thus, by more accurately regulating the inductor current, the output voltage and/or output current of the converter is regulated, and the load, power converter, or system are protected from damage due to over current.

FIGS. 4A-4C, collectively FIG. 4, are graphical illustrations of the sensed current before and after adaptive compensation. The illustration shown in FIG. 4 consists of three graphs 412, 424, and 436, all sharing the same horizontal axis. While these graphs depict three specific input voltage and output voltage combinations, the number of input voltage and output voltage combinations is not limited to the values disclosed herein.

Graph 412 depicts the actual sense signal 404, the compensated sense signal 402, the ideal sense signal 406, the compensating signal 410, and the inductor current signal 408 with respect to time. The input voltage for graph 412 is 5.5 volts and the output voltage is 0.6 volts. At 4.5 microseconds (μs), the compensating signal 410 is applied to the actual sense signal 404, resulting in the compensated sense signal 402. The compensating signal 410 is dependent on the input voltage and output voltage of the power conversion circuit. During high side operation (i.e., the high side switch 114 of FIG. 1 is conducting) the compensating signal will be equivalent or proportional to the value shown in equation (3). During low side operation (i.e., the low side switch 116 of FIG. 1 is conducting) the compensating signal will be equivalent or proportional to the value shown in equation (4). It is clear in the depictions shown herein that the compensated sense signal 402 tracks the ideal sense signal 406 with less variations than the actual sense signal 404.

Graph 424 depicts the actual sense signal 416, the compensated sense signal 414, the ideal sense signal 418, the compensating signal 422, and the inductor current signal 420 with respect to time. The input voltage for graph 424 is 3.7 volts and the output voltage is 1 volt. At 4.5 microseconds (μs), the compensating signal 422 is applied to the actual sense signal 416, resulting in the compensated sense signal 414. The compensating signal 422 is dependent on the input voltage and output voltage of the power conversion circuit. During high side operation (i.e., the high side switch 114 of FIG. 1 is conducting) the compensating signal will be equivalent or proportional to the value shown in equation (3). During low side operation (i.e., the low side switch 116 of FIG. 1 is conducting) the compensating signal will be equivalent or proportional to the value shown in equation (4). It is clear in the depictions shown herein that the compensated sense signal 414 tracks the ideal sense signal 418 with less variations than the actual sense signal 416.

Graph 436 depicts the actual sense signal 428, the compensated sense signal 426, the ideal sensed signal 430, the compensating signal 434, and the inductor current signal 432 with respect to time. The input voltage for graph 436 is 2.5 volts and the output voltage is 1.8 volts. At 4.5 microseconds (μs), the compensating signal 434 is applied to the actual sense signal 428, resulting in the compensated sense signal 426. The compensating signal 434 is dependent on the input voltage and output voltage of the power conversion circuit. During high side operation (i.e., the high side switch 114 of FIG. 1 is conducting) the compensating signal will be equivalent or proportional to the value shown in equation (3). During low side operation (i.e., the low side switch 116 of FIG. 1 is conducting) the compensating signal 434 will be equivalent or proportional to the value shown in equation (4). It is clear in the depictions shown herein that the compensated sense signal 426 tracks the ideal sensed signal 430 with less variations than the actual sensed signal 428.

FIGS. 5A-5C, collectively FIG. 5, are graphical illustrations of the over current comparator 110 triggering times before compensation has been applied. The illustration shown in FIG. 5 consists of three graphs 510, 520, and 530, all sharing the same horizontal axis. While these graphs depict three specific input voltage and output voltage combinations, the number of input voltage and output voltage combinations is not limited to the values disclosed herein.

Graph 510 depicts the triggering of the overcurrent comparator 110 signal 502 without compensation with respect to time. The input voltage for graph 510 is 5.5 volts and the output voltage for graph 510 is 0.6 volts. Noted herein, the over current comparator 110 was set to trigger at 1.5 amperes with respect to the sense signal 508. The triggering point of the over current comparator 110 of FIG. 1 is not limited to the specific value disclosed herein. For example, the triggering point of the over current comparator 110 may be 0.5 amperes, 3 amperes, etc. The triggering point will theoretically trigger the over current comparator 110 of FIG. 1 when the sense signal 508 reaches the triggering point. This theoretical point is shown as a coordinate 504. Clearly noted, because of the intrinsic delay in the over current comparator 110 and the intrinsic delay of the sense signal 508, the comparator instead triggers at a point 506 when then inductor current is 2.11 amperes.

Graph 520 depicts the triggering of the overcurrent comparator signal 512 without compensation with respect to time. The input voltage for graph 510 is 3.7 volts and the output voltage for graph 510 is 1 volt. Noted herein, the over current comparator 110 was set to trigger at 1.5 amperes with respect to the sense signal 518. The triggering point of the over current comparator 110 is not limited to the specific value disclosed herein. For example, the triggering point of the over current comparator 110 may be 0.5 amperes, 3 amperes, etc. The triggering point will theoretically trigger the over current comparator 110 when the sense signal 518 reaches the triggering point. This theoretical point is shown as a coordinate 514. Clearly noted, because of the intrinsic delay in the over current comparator 110 and the intrinsic delay of the sense signal 518, the comparator instead triggers at a point 516 when then inductor current is 1.88 amperes.

Graph 530 depicts the triggering of the overcurrent comparator signal 522 without compensation with respect to time. The input voltage for graph 530 is 2.5 volts and the output voltage for graph 530 is 1.8 volts. Noted herein, the over current comparator 110 was set to trigger at 1.5 amperes with respect to the sense signal 528. The triggering point of the over current comparator 110 is not limited to the specific value disclosed herein. For example, the triggering point of the over current comparator 110 may be 0.5 amperes, 3 amperes, etc. The triggering point will theoretically trigger the over current comparator 110 when the sense signal 528 reaches the triggering point. This theoretical point is shown as a coordinate 524. Clearly noted, because of the intrinsic delay in the over current comparator 110 and the intrinsic delay of the sense signal 528, the comparator instead triggers at a point 526 when then inductor current is 1.58 amperes.

FIGS. 6A-6C, collectively FIG. 6, are graphical illustrations of the over current comparator triggering times after compensation has been applied. The illustration shown in FIG. 6 consists of three graphs 610, 620, and 630, all sharing the same horizontal axis. While these graphs depict three specific input voltage and output voltage combinations, the number of input voltage and output voltage combinations is not limited to the values disclosed herein.

Graph 610 depicts the triggering of the overcurrent comparator signal 602 with compensation with respect to time. Over compensation is done by increasing the gain of the compensating signal. Thus, compensating for the delay in the current sensing circuitry and the comparator delay. For example, resistor values in the adaptive compensating circuit may be tuned to higher or lower resistance values. In turn, the gain of the compensating signal can be increased and/or decreased. The input voltage for graph 610 is 5.5 volts and the output voltage for graph 610 is 0.6 volts. Noted herein, the over current comparator 110 was set to trigger at 1.5 amperes with respect to the compensated sense signal 608. The triggering point of the over current comparator 110 is not limited to the specific value disclosed herein. For example, the triggering point of the over current comparator 110 may be 0.5 amperes, 3 amperes, etc. The triggering point will theoretically trigger the over current comparator 110 when the compensated sense signal 608 reaches the triggering point and the comparator delay has passed. This theoretical point is shown as a coordinate 604. Because the compensated sense signal 608 has been over compensated, it triggers the over current comparator 110 earlier. The comparator triggers at a point 606 when then inductor current is 1.48 amperes. These results clearly depict accounting for the comparator delay and current sensing delay through the overcompensation of the compensated sense signal 608.

Graph 620 depicts the triggering of the overcurrent comparator signal 612 with compensation with respect to time. Over compensation is done by increasing the gain of the compensating signal. Thus, compensating for the delay in the current sensing circuitry and the comparator delay. For example, resistor values in the adaptive compensating circuit may be tuned to higher or lower resistance values. In turn, the gain of the compensating signal can be increased and/or decreased. The input voltage for graph 620 is 3.7 volts and the output voltage for graph 620 is 1 volt. Noted herein, the over current comparator 110 was set to trigger at 1.5 amperes with respect to the compensated sensed signal 618. The triggering point of the over current comparator 110 is not limited to the specific value disclosed herein. For example, the triggering point of the over current comparator 110 may be 0.5 amperes, 3 amperes, etc. The triggering point will theoretically trigger the over current comparator 110 when the compensated sense signal 618 reaches the triggering point and the comparator delay has passed. This theoretical point is shown as a coordinate 614. Because the compensated sense signal 618 has been over compensated, it triggers the over current comparator 110 earlier. The comparator triggers at a point 616 when then inductor current is 1.54 amperes. These results clearly depict accounting for the comparator delay and current sensing delay through the overcompensation of the compensated sense signal 618.

Graph 630 depicts the triggering of the overcurrent comparator signal 622 with compensation with respect to time. Over compensation is done by increasing the gain of the compensating signal. Thus, compensating for the delay in the current sensing circuitry and the comparator delay. For example, resistor values in the adaptive compensating circuit may be tuned to higher or lower resistance values. In turn, the gain of the compensating signal can be increased and/or decreased. The input voltage for graph 630 is 2.5 volts and the output voltage for graph 630 is 1.8 volts. Noted herein, the over current comparator 110 was set to trigger at 1.5 amperes with respect to the compensated sense signal 628. The triggering point of the over current comparator 110 is not limited to the specific value disclosed herein. For example, the triggering point of the over current comparator 110 may be 0.5 amperes, 3 amperes, etc. The triggering point will theoretically trigger the over current comparator 110 when the compensated sense signal 628 reaches the triggering point and the comparator delay has passed. This theoretical point is shown as a coordinate 624. Because the compensated sense signal 628 has been over compensated, it triggers the over current comparator 110 earlier. The comparator triggers at a point 626 when then inductor current is 1.50 amperes. These results clearly depict accounting for the comparator delay and current sensing delay through the overcompensation of the compensated sense signal 628.

Figure 7:
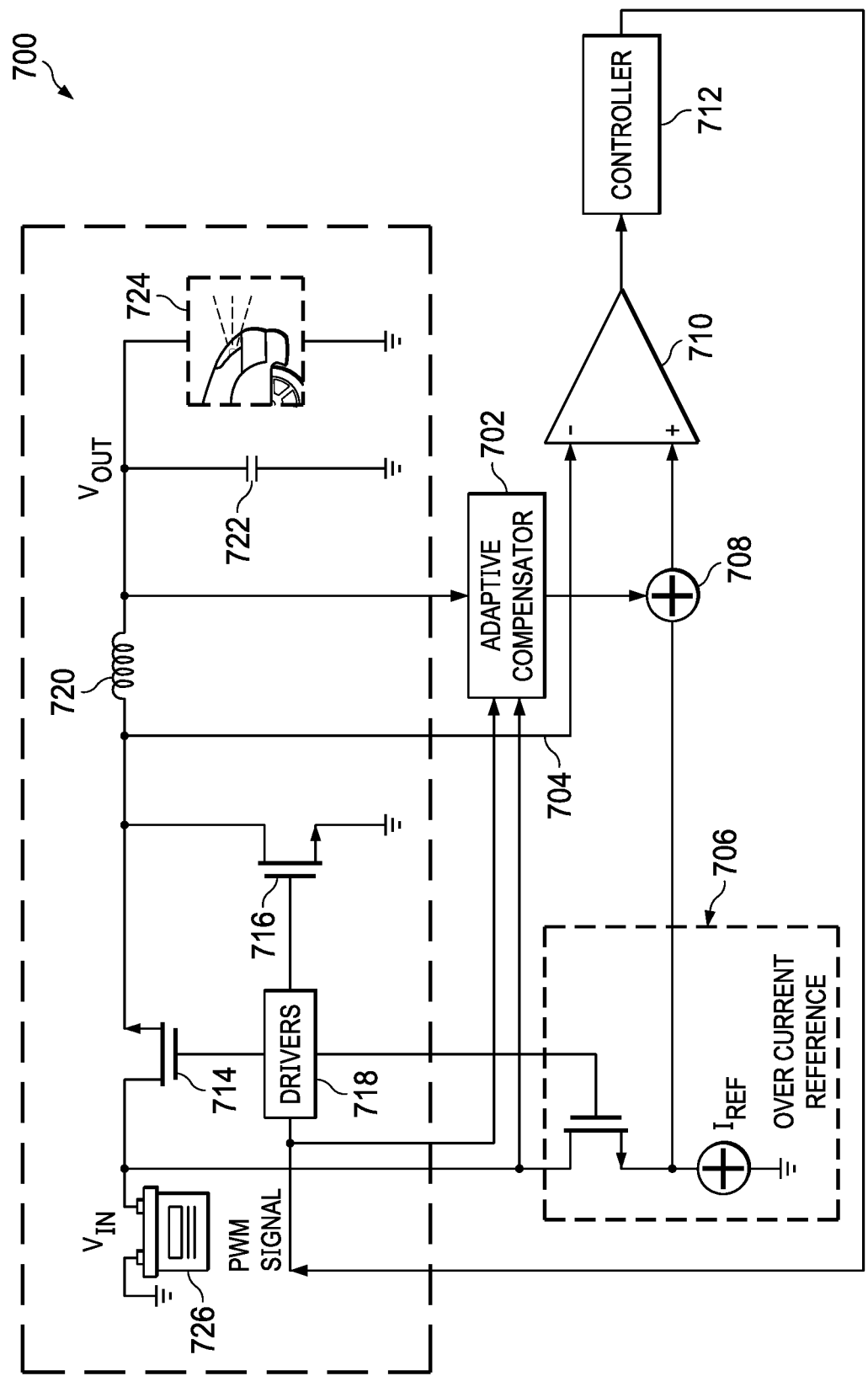
FIG. 7 is a block diagram of a power converter including adaptive circuitry coupled to an over current reference.

FIG. 7 is a block diagram of a power converter 700 including adaptive circuitry coupled to an over current reference. Further, FIG. 7 is a schematic illustration of an example implementation of the adaptive compensator 702 in a buck converter wherein the signal generated by the adaptive compensator 702 is injected into the over current reference signal 706. In other example implementations, the adaptive compensator 702 may be coupled with a boost converter, buck-boost converter, or any other switched mode power supplies not directly disclosed herein. The adaptive compensator 702 is coupled to a current measuring circuit 704. In the example implementation illustrated in FIG. 7, the adaptive compensator 702 is coupled to the over current reference 706 so that the intrinsic delay of the over current comparator 710 and the intrinsic delay of the current sensing circuitry is accounted for. The over current comparator 710 is coupled to a controller 712 wherein the controller 712 is coupled to the power converter PWM signal.

The example adaptive compensator 702 is coupled to the example power converter 700 (e.g., buck converter) so that the input voltage and output voltage is received. The adaptive compensator 702 receives a variant of the PWM signal so that the switch operation may be determined. In this example, when the example high side power FET 714 is operating, the voltage signifying the switch operation received by the adaptive compensator 702 will be high. When the example low side power FET 716 is operating, the voltage signifying the switch operation received by the adaptive compensator 702 will be low. Additionally, the adaptive compensator 702 generates an output signal which is variable respective to the input voltage and output voltage of the power conversion circuit.

The current measuring circuit 704 is coupled to the power conversion circuit and the inverting input terminal of the over current comparator. Further, the current measuring circuit is coupled to the high side of the inductor 720 such the switch (high side power FET 714 and/or low side power FET 716) node voltage is received. In other examples, the current measuring circuit may include sensing field effect transistors (Sensing FETs) which generate a voltage and/or current proportional the current through the inductor 720 via internal drain to source resistances (RD $S_{ON}$) of the Sensing FET and the high side power FET 714 and/or the low side power FET 716.

The over current reference 706 generates a signal representative of a constant current needed through the power conversion circuit. The signal generated by the over current reference ensure the steady operation of the power conversion circuit. For example, the over current reference 706 may generate a current signal of 1.5 amperes, therefore setting a maximum current through the inductor 720 of 1.5 amperes. In this scenario, the maximum positive inductor current and/or minimum negative inductor current(s) is/are more accurately controlled, thus, regulating the inductor current and/or output voltage more accurately to provide current and/or voltage protection to the load 724, system, and/or power converter 700. In examples disclosed herein, the output of the over current reference 706 is coupled to the adaptive compensator 702 so that the signal generated by the adaptive compensator is injected into the signal generated by the over current reference. The signal generated by the adaptive compensator may be a voltage, current, etc. signal. Likewise, the signal generated by the over current reference may be a voltage, current, etc. signal.

The example summing junction 708 is coupled to the adaptive compensator 702 and the over current reference 706. The summing junction 708 injects the adaptive compensator 702 signal into the over current reference 706 signal. The summing junction ensures the adaptive compensator 702 signal is added or subtracted to the over current reference 706 signal. The output of the summing junction 708 is a voltage signal. The output signal of the summing junction 708 is coupled to the non-inverting terminal of the over current comparator 710.

The example over current comparator 710 receives two inputs and generates one output. The newly compensated signal from the summing junction 708 is coupled to the non-inverting input terminal and the signal generated by the current measuring circuit 704 is coupled to the inverting input terminal. In other examples, the newly compensated signal from the summing junction 708 may be coupled to the inverting input terminal and the signal generated by the current measuring circuit 704 may be coupled to the non-inverting input terminal. The output of the over current comparator 710 is a logic high or logic low signal, coupled to a controller 712.

The example controller 712 is used to regulate certain values in the example power conversion circuit. In this example, the peak current seen by the inductor 720 is regulated to maintain a certain value, determined by the over current reference 706. In this manner, the maximum positive inductor current and/or minimum negative inductor current(s) is/are more accurately controlled, thus, regulating the inductor current and/or output voltage more accurately to provide current and/or voltage protection to the load 724, system, and/or power converter 700. The controller 712 exists in the form of, but not limited to, a microcontroller. In other examples, the controller 712 may be implemented with discrete components.

The example high side power field effect transistor (high side power FET) 714 is an electronic switch which operates (i.e., conducts) when the incoming PWM signal is high. Alternatively, the high side power FET 714 may be a bipolar junction transistor (BJT), metal oxide semiconductor field effect transistor (MOSFET), junction gate field effect transistor (JFET), etc.

The example low side power field effect transistor (high side power FET) 714 is an electronic switch which operates (i.e., conducts) when the incoming PWM signal is low. Alternatively, the low side power FET 716 may be a bipolar junction transistor (BJT), metal oxide semiconductor field effect transistor (MOSFET), junction gate field effect transistor (JFET), etc.

The PWM signal is a turn-on and/or turn-off signal generated to control the operation of the high side power FET 714 and/or low side power FET 716. An example Pulse Width Modulated (PWM) signal is injected into an example driver 718. The PWM signal is an oscillating signal varying in duty cycle. Alternatively, the PWM signal may vary in frequency, therefore noted as a Pulse Frequency Modulated signal (PFM). The PWM and/or PFM signal injected into the driver 718 contains information pertaining to the turn on and/or turn off times of the example high side power FET 714 and/or the example low side power FET 716. In other examples, the PWM and/or PFM signal injected into the driver 718 may contain information pertaining to the turn on and/or turn off times of any power switch.

The example driver 718 receives the PWM signal and based on the amplitude of the PWM signal, operates either the high side power FET 714 and/or the low side power FET 716. The driver 718 receives a low current digital input signal, PWM signal. This signal is then utilized by the driver 718 to turn on a high current switch, i.e., the high side power FET 714 and/or low side power FET 716. The driver differentiates high sider power FET 714 operation from low side power FET 716 operation.

The example inductor 720 is a two terminal electrical component which stores energy in a magnetic field when current flows through it. During high side operation (i.e., the high side power FET 714 is conducting) energy is being stored in the inductor 720. On the other hand, during low side operation (i.e., the low side power FET is conducting) energy is being discharged through the inductor 720.

The example capacitor 722 is a two terminal electrical component which stores potential energy in an electric field. During high side operation (i.e., the high side power FET 714 is conducting) potential energy is being stored in the capacitor 722. On the other hand, during low side operation (i.e., the low side power FET 716 is conducting) potential energy is being discharged through the capacitor 722.

The example load 724 is a component of the circuit which consumes electrical power. The load 724 includes, but not limited to, capacitive loads, inductive loads, resistive loads, or any combination set forth herein. In this example, the load 724 directly corresponds to a load of automobile application. For example, the load 724 may consist of interior lights in an automobile or electrical relays in an automobile.

The example input voltage 726 is a car battery. The example input voltage 728 is coupled to the power conversion circuit such that the input voltage is received by the high side power FET 714.

Figure 8:
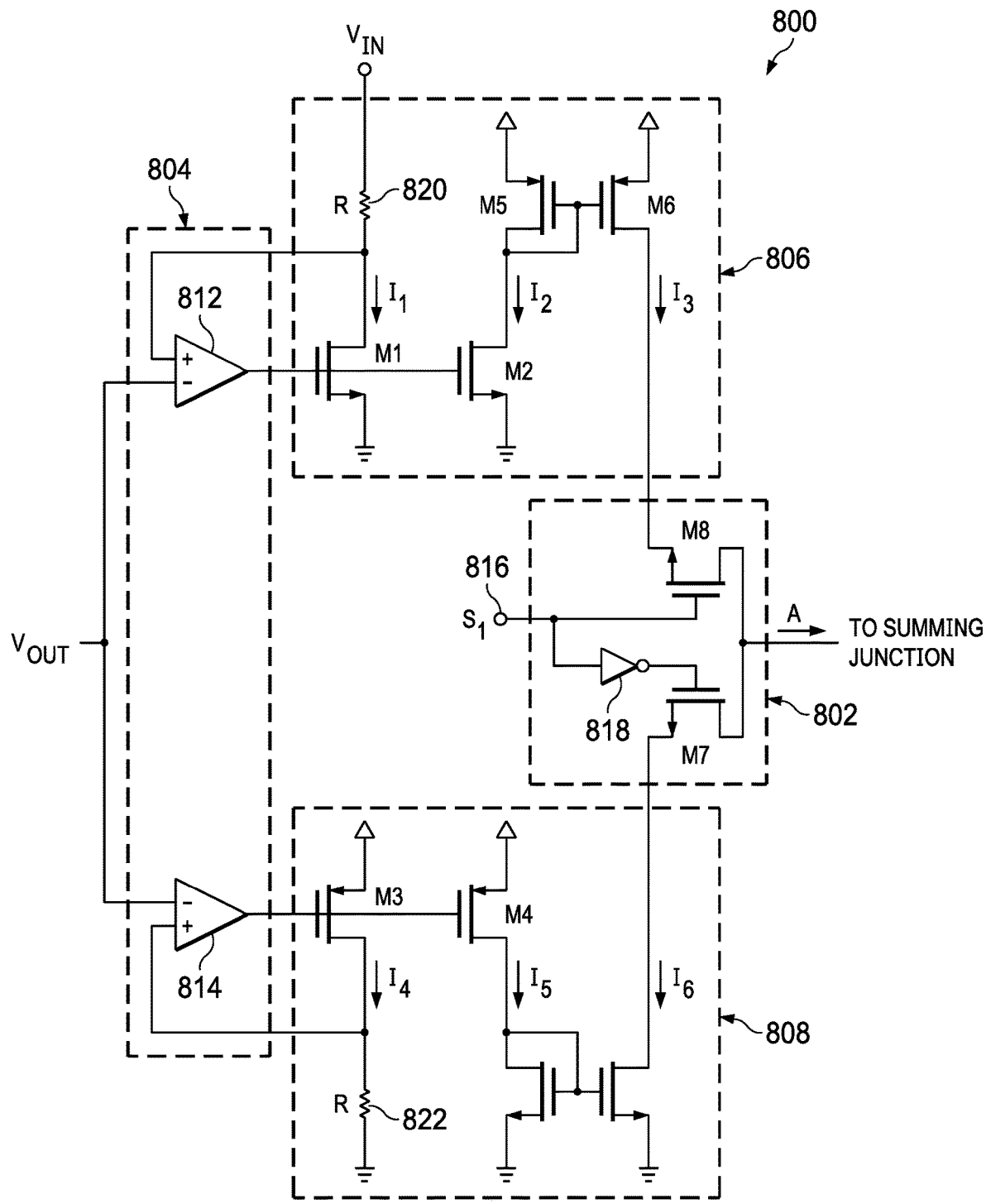
FIG. 8 is a schematic including further detail of alternative example circuitry that may be used to implement the adaptive compensator of FIG. 1.

FIG. 8 is a schematic including further detail of alternative example circuitry 800 that may be used to implement the adaptive compensator of FIG. 1. The current A is generated by an example switching circuit 802 coupled with an example high side operation current mirror 806 and example low side operation current mirror 808. Additionally, an example output voltage receiving circuit 804 is coupled to the high side operation current mirror 806 and the low side operation current mirror 808. The output current is coupled to the example summing junction 108.

The example switching circuit 802 receives a switching signal 816. The switching signal 816 is dependent on the operation of the example power conversion circuit of FIG. 1. For example, when the high side switch 114 is conducting, the switching signal 816 will turn on switch S1; thus, current $I_3$ will compose the current A. Likewise, when the low side switch 116 is conducting, the switching signal 816 will conduct through the example not gate 818. The not gate 818 may be implemented as a NMOS inverter, PMOS inverter, CMOS inverter, etc. In this case, current $I_6$ will compose current A.

The example output voltage receiving circuit 804 is coupled to the output voltage of the power conversion circuit and the high side operation current mirror 806 and low side operation current mirror 808. Two operational amplifiers 812, 814 are coupled to receive the output voltage of the power converter 100 of FIG. 1 in their respective inverting terminals. Due to the operating nature of an operational amplifier in the configuration disclosed herein, the output voltage at the inverting terminal of operational amplifier 812 is replicated on the non-inverting terminal of the operational amplifiers 812. Likewise, the output voltage at the inverting terminal of operational amplifier 814 is replicated on the non-inverting terminal of the operational amplifiers 814.

The example high side operation current mirror 806 includes a current mirror configuration of NMOS and/or PMOS transistors. In the current mirror configuration, currents $I_1$, $I_2$, and $I_3$ will be equivalent. With the output voltage replicated on the non-inverting terminal of the operational amplifier 812, the voltage at the non-inverting terminal node becomes equivalent to the output voltage. Thus, with the voltage drop over the resistor 820, the Current $I_1$ is composed based on the following equation:

$$I_1 = I_2 = I_3 = A = \frac{V_{IN} - V_{OUT}}{R} \tag{5}$$

The resistor 820 may be any resistance value. The resistor 820 may be a variable resistor, power resistor, ceramic resistor, etc. The resistor 820 may be any device which causes a voltage drop from $V_{IN}$.

The example low side operation current mirror 808 includes a current mirror configuration of NMOS and/or PMOS transistors. In the current mirror configuration, currents $I_4$, $I_5$, and $I_6$ will be equivalent. With the output voltage replicated on the non-inverting terminal of the operational amplifier 814, the voltage at the non-inverting terminal node becomes equivalent to the output voltage. Thus, with the voltage drop over the resistor 822, the Current $I_4$ is composed based on the following equation:

$$I_4 = I_5 = I_6 = \frac{V_{OUT} - 0}{R} \quad (6)$$

The resistor 822 may be any resistance value. The resistor 822 may be a variable resistor, power resistor, ceramic resistor, etc. The resistor 822 may be any device which causes a voltage drop from $V_{IN}$. Since the current $I_6$ is flowing opposite to the switching circuit 802 during low side operation (i.e., switch M7 is conducting), the current A will be equivalent to the negative value of $I_6$. More specifically:

$$A = \frac{-V_{OUT}}{R} \quad (6)$$

While an example manner of implementing the adaptive compensator of FIG. 1 is illustrated in FIGS. 2, 3, 7, and/or 8, one or more of the elements, processes and/or devices illustrated in FIGS. 2, 3, 7, and/or 8 may be combined, divided, re-arranged, omitted, eliminated and/or implemented in any other way. Further, the example current mirror circuit, the example voltage receiving circuit, the example current source circuit, the example current biasing circuit, the example adaptive compensator, the example switching signal of FIG. 2, and/or the example switching circuit, the example high side operation current mirror, the example low side operation current mirror, the example output voltage receiving circuit, the example adaptive compensator and/or, more generally, the example adaptive compensator of FIG. 1 may be implemented by hardware, software, firmware and/or any combination of hardware, software and/or firmware. Thus, for example, any of the example the example current mirror circuit, the example voltage receiving circuit, the example current source circuit, the example current biasing circuit, the example adaptive compensator of FIG. 2, and/or the example switching circuit, the example high side operation current mirror, the example low side operation current mirror, the example output voltage receiving circuit, the example adaptive compensator and/or, more generally, the example adaptive compensator could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example current mirror circuit, the example voltage receiving circuit, the example current source circuit, the example current biasing circuit, the example adaptive compensator of FIG. 2, and/or the example switching circuit, the example high side operation current mirror, the example low side operation current mirror, the example output voltage receiving circuit, the example adaptive compensator is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptive compensator of FIG. 1 may include one or more elements, processes and/or devices in addition to, or instead of, those illustrated in FIGS. 2, 3, 7, and/or 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
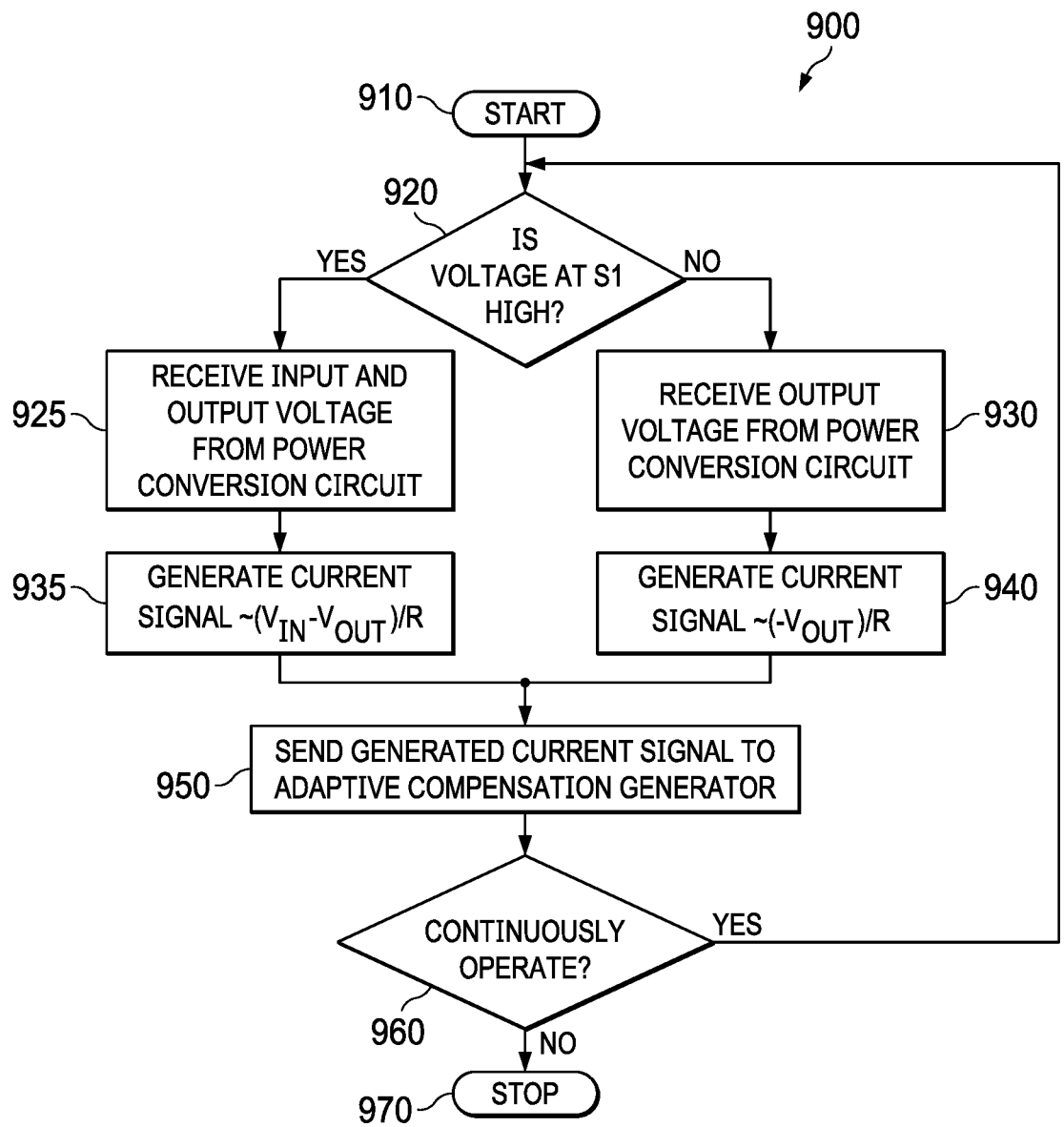
FIG. 9 is a flowchart representative of the processes implemented by the adaptive compensator.

A flowchart representative of example hardware logic, machine readable instructions, hardware implemented state machines, and/or any combination thereof for implementing the adaptive compensator of FIG. 1 is shown in FIG. 9 900. The machine readable instructions may be an executable program or portion of an executable program for execution by a computer processor such as the processor 1012 shown in the example processor platform 1000 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example adaptive compensator may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 9 includes the example current mirror circuit 218, the example voltage receiving circuit 208, the example current source circuit 206, the example current biasing circuit 202, the example adaptive compensator, the example switching signal of FIG. 2, and/or the example switching circuit 802, the example high side operation current mirror 806, the example low side operation current mirror 808, the example output voltage receiving circuit 804, or the example adaptive compensator of FIG. 8. To initiate 910, the voltage receiving circuit 208 operates the switch 222 depending on whether the voltage of the PWM signal is high or low. During high voltage, the high side power FET 114 is conducting, and during low voltage, the low side power FET 116 is conducting. The voltage receiving circuit 208 will operate accordingly if the voltage at the switch 222 is high 920. Process 925 receives the input and output voltage from the power conversion circuit. The output current is then generated 935 through the current mirror circuit 218 and distributed 950 into the summing junction 108. The current generated is equivalent to the value displayed in equation (3).

In the event that the voltage at the switch 222 is low, the voltage receiving circuit 208 will receive 930 only the output voltage. The output current is then generated 940 though the current mirror circuit 218 and distributed 950 into the summing junction 108. The current generated is equivalent to the value displayed in equation (4). Additionally, all currents generated in the adaptive compensator, over current reference, and/or current sensor may be any current metric which is representative of the current value being produced, sensed and/or retrieved. For example, the current metric from the over current reference may be of voltage type in which the voltage is proportional to the current metric.

Block 960 describes the confirmation to continuously monitor and generate the adaptive compensating current. Periods in which the device will stop 970 include power loss, damage to the device, or any time in which current monitoring may stop not disclosed herein. Typically, the adaptive compensator will continuously generate an adaptive current signal, thus returning to step 920.

Figure 10:
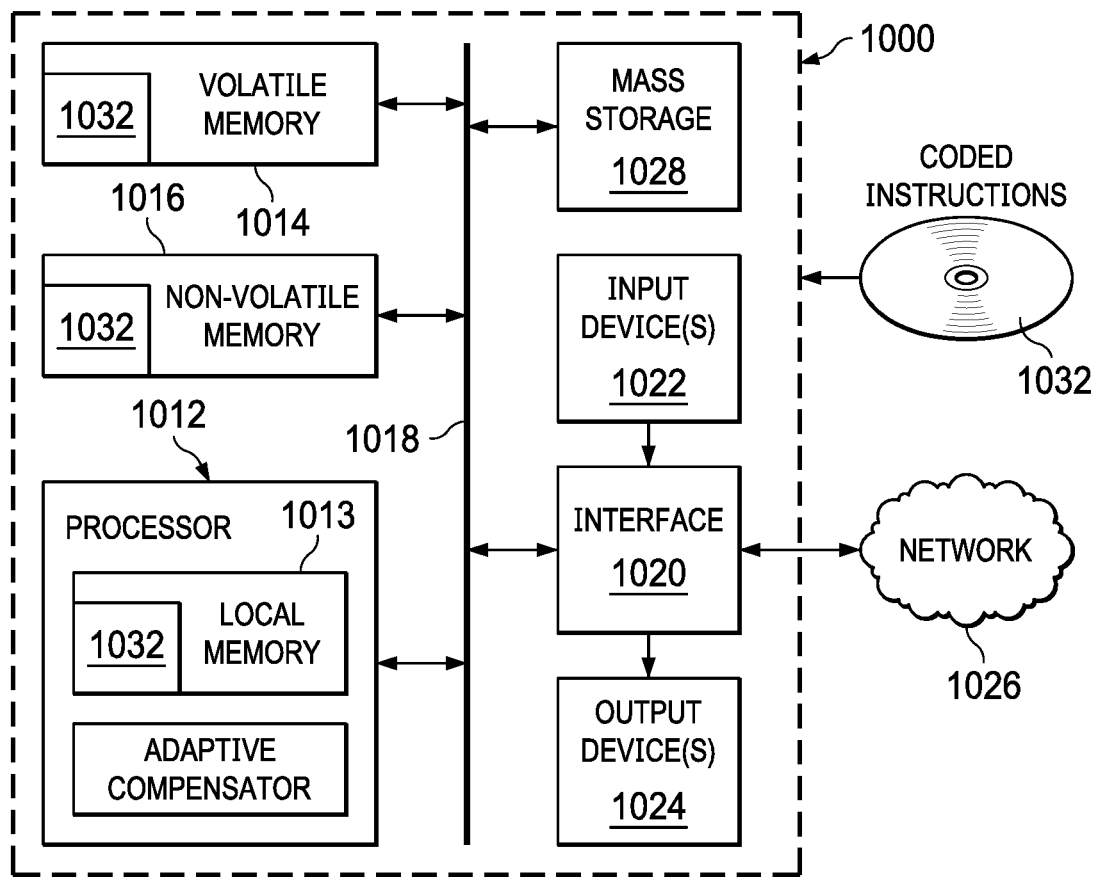
FIG. 10 is a block diagram of an example processing platform structured to execute the instructions of FIGS. 2, 3, 7, and/or 8 to create an adaptive compensation signal.

FIG. 10 is a block diagram of an example processor platform 1000 structured to execute the instructions of FIGS. 2, 3, 7, and/or 8 to implement the adaptive compensator of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example current mirror circuit, the example voltage receiving circuit, the example current source circuit, the example current biasing circuit, the example adaptive compensator, the example switching signal of FIG. 2, and/or the example switching circuit, the example high side operation current mirror, the example low side operation current mirror, the example output voltage receiving circuit, or the example adaptive compensator.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAIVIBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that significantly improve the current limit accuracy in buck converters or other switched mode power supplies. The disclosed methods, apparatus and articles of manufacture improve the efficiency of using a computing device by creating an adaptive compensating offset that is dependent on the input voltage and output voltage of the power converter. The adaptive compensating offset provides variable compensation to maximize the current limit accuracy when the input voltage and/or output voltage changes significantly. Additionally, examples disclosed herein improve the output current capacity of a power converter, such as a switched mode power supply. Likewise, examples disclosed herein allow for the extension of the safe operating area of a power converter. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a power conversion circuit having an input and an output, the power conversion circuit including:
an adaptive compensator coupled to the output of the power conversion circuit, the adaptive compensator including:
a voltage receiving circuit to generate a first current that is a function of a voltage at the output of the power conversion circuit and a second current that is a function of a voltage at the input of the power conversion circuit;
a current mirror circuit coupled to the voltage receiving circuit, wherein the current mirror circuit replicates at least one of the first current or the second current; and an output of the adaptive compensator resulting from subtracting the second current from the first current; and
a comparator to receive an input from the output of the adaptive compensator.

2. The apparatus of claim 1 wherein the output of the adaptive compensator is summed with a third current.

3. The apparatus of claim 2 wherein the adaptive compensator compensates one or more of a first delay in a current sensor and a second delay in the comparator.

4. The apparatus of claim 1 wherein a switching signal generated by the adaptive compensator is dependent on a first voltage of a high side switch and a second voltage of a low side switch.

5. An adaptive compensator configured to:
detect an input voltage and an output voltage;
generate a first current that is a function of the input voltage;
generate a second current that is a function of the output voltage;
generate a third current resulting from subtracting the first current from the second current;
transmit the third current in response to receiving a switching signal; and
compare, using a comparator, the third current with a reference current.

6. The adaptive compensator of claim 5 wherein the third current is coupled to the output of a current sensor at a summing junction.

7. The adaptive compensator of claim 6 wherein the summing junction produces a voltage proportional to a compensated sensed signal.

8. The adaptive compensator of claim 5 wherein the third current is used to compensate one or more of a first delay in a current sensor and a second delay in the comparator.

9. The adaptive compensator of claim 5 wherein the switching signal is dependent on a first voltage of a high side switch and a second voltage of a low side switch.

10. A method comprising:
sensing a first current metric representative of the current through a high side power switch;
generating an over current reference;
generating a second current metric and summing the second current metric with the first current metric to create a third current metric; and
comparing the third current metric with the over current reference and outputting a result to a controller.

11. The method of claim 10 wherein the first current metric is representative of a peak input current of a power conversion circuit.

12. The method of claim 10 wherein the second current metric is dependent on a first voltage and a second voltage in a power conversion circuit.

13. The method of claim 12 wherein the first voltage is an input voltage of the power conversion circuit and the second voltage is an output voltage of the power conversion circuit.

14. The method of claim 10 wherein the second current metric is summed with the first current metric to adjust for one or more of a first intrinsic delay when generating the first current metric, and a second intrinsic delay when comparing signals.

15. The method of claim 10 wherein the third current metric is a voltage representative of a compensated sensed inductor current in a power conversion circuit.

* * * * *